A. GREENBURG.
POWER TRANSMISSION MECHANISM.
APPLICATION FILED FEB. 17, 1914.
1,109,218.
Patented Sept. 1, 1914.
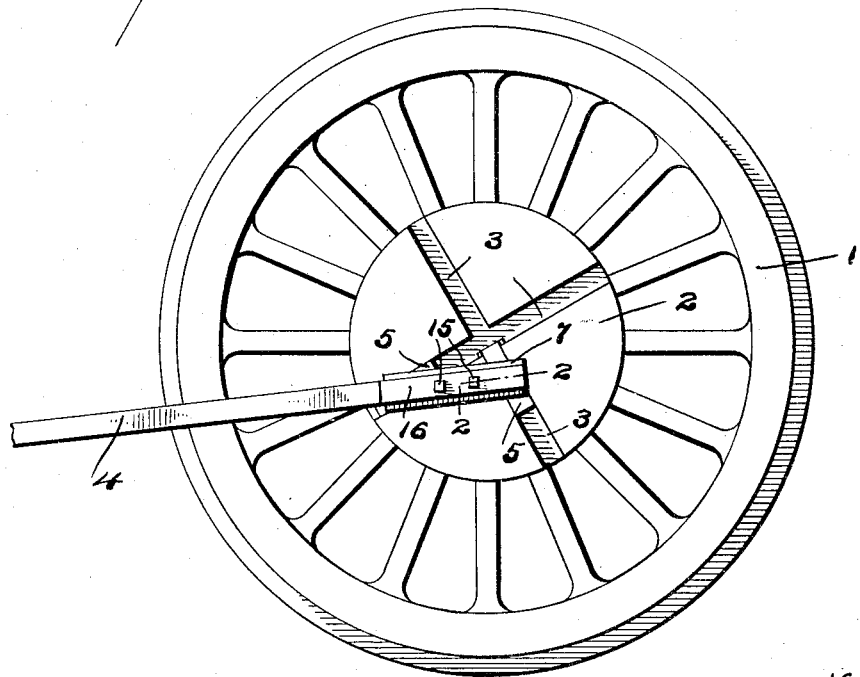
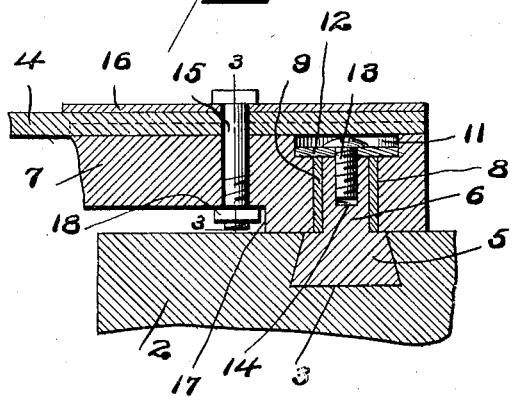
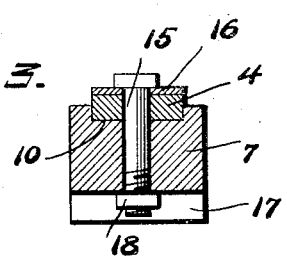
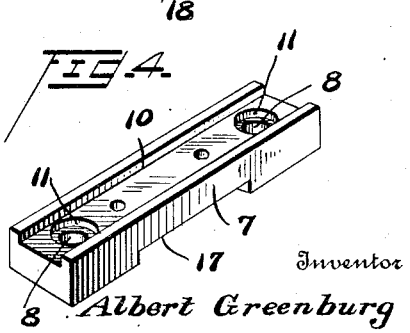
Inventor
Albert Greenburg
By Joshua R. H. Potts.
Attorney
Witnesses
Harold Strauss
C. R. Ziegler.

UNITED STATES PATENT OFFICE.

ALBERT GREENBURG, OF OAKVILLE, PENNSYLVANIA.

POWER-TRANSMISSION MECHANISM.

1,109,218. Specification of Letters Patent. Patented Sept. 1, 1914.

Application filed February 17, 1914. Serial No. 819,153.

*To all whom it may concern:*

Be it known that I, ALBERT GREENBURG, a citizen of the United States, residing at Oakville, in the county of Cumberland and State of Pennsylvania, have invented certain new and useful Improvements in Power-Transmission Mechanism, of which the following is a specification.

My invention relates to improvements in power transmission mechanism, the object of the invention being to provide improved means for connecting the driving rod of a locomotive with the driving wheel so that the ordinary crank pins or wrist pins may be dispensed with and power applied at two points on the wheel.

A further object is to provide improvements of this character which facilitate the connection and disconnection of the rod, and which insures a strong and durable construction in use.

With these and other objects in view, the invention consists in certain novel features of construction and combinations and arrangements of parts as will be more fully hereinafter described and pointed out in the claims.

In the accompanying drawings: Figure 1 is a view in side elevation illustrating my improvements. Fig. 2 is a fragmentary view in longitudinal section on an enlarged scale on the line 2—2 of Fig. 1 illustrating the connection between one of the sliding blocks and the connecting bar. Fig. 3 is a view in cross section on the line 3—3 of Fig. 2. Fig. 4 is a perspective view of the connecting bar.

1 represents a driving wheel having an integral enlargement 2 at its center formed with dove-tailed grooves 3 located at right angles to each other and crossing at the center of the enlargement.

4 is a connecting rod adapted to be driven by the ordinary engine, and this rod is designed to transmit motion to the wheel 1 as will now be described.

In the grooves 3, dove-tailed blocks 5 are mounted to slide. Each block 5 has a cylindrical stud 6 which projects out from the enlargement 2.

7 is a connecting bar which is provided at its ends with cylindrical openings 8 to receive bearing sleeves 9 in which the studs 5 project.

The outer face of the bar 7 is formed with a longitudinal groove 10, and circular recesses 11 are formed in the outer face of the bar concentric with the openings 9. Washers 12 are positioned in these recesses 11, and screws 13 are projected through the washers and screwed into threaded sockets 14 in the studs 6, so that while the latter are permitted a free rotary movement, they are securely coupled to the bar 7.

The connecting rod 4 is located in the longitudinal groove 10 in block 7, and is secured by bolts 15 which are projected through registering openings in a covering plate 16 and through openings in the connecting rod 4, and bar 7, the intermediate portion of the bar 7 is recessed on its under face as shown at 17 to provide ample space for the accommodation of nuts 18 on the inner ends of the bolts 14.

By reason of the construction above described, the reciprocating movement of the connecting rod imparts a rotary movement to the driving wheel, the blocks 5 moving longitudinally in their grooves as will be readily understood.

It will be noted that when the parts are in assembled position, the connecting rod 4 is positioned over the recesses 11, so that it is impossible for the screws 13 to work loose and hence impossible for the parts to become disconnected.

Various slight changes might be made in the general form and arrangement of parts described without departing from my invention, and hence I do not limit myself to the precise details set forth, but consider myself at liberty to make such changes and alterations as fairly fall within the spirit and scope of the appended claims.

Having thus described my invention, what I claim as new and desire to secure by Letters Patent is:

1. The combination with a rotary element having grooves therein at right angles to each other and crossing each other, a reciprocating element comprising a bar having openings in its ends, blocks in the grooves having studs thereon positioned in the openings in the bar, bearing sleeves around said studs in the openings, said bar having recesses in its outer face, disks in said recesses secured to the ends of the studs, said bar having a longitudinal groove in its outer face, and a connecting rod secured in said groove and covering the said recesses, substantially as described.

2. The combination with a rotary element having grooves therein at right angles to each other and crossing each other, a reciprocating element comprising a bar having openings in its ends, blocks in the grooves having studs thereon positioned in the openings in the bar, bearing sleeves around said studs in the openings, said bar having recesses in its outer face, disks in said recesses secured to the ends of the studs, said bar having a longitudinal groove in its outer face, a connecting rod secured in said groove and covering the said recesses, said bar having a recess in its under face, and bolts projected through the connecting rod and said bar, and nuts on said bolts located in the last-mentioned recesses, substantially as described.

In testimony whereof I have signed my name to this specification in the presence of two subscribing witnesses.

ALBERT GREENBURG.

Witnesses:
CHARLES ALLEN KENT,
BOYD CLEVELAND BAKER.

Copies of this patent may be obtained for five cents each, by addressing the "Commissioner of Patents, Washington, D. C."